(12) United States Patent
Duarte et al.

(10) Patent No.: US 10,954,926 B2
(45) Date of Patent: Mar. 23, 2021

(54) DEVICE FOR APPLYING IN A PAVEMENT FOR COLLECTING MECHANICAL ENERGY FROM VEHICLES PASSING OVER FOR GENERATING ELECTRICITY

(71) Applicants: UNIVERSIDADE DE COIMBRA, Coimbra (PT); UNIVERSIDADE DA BEIRA INTERIOR, Covilhã (PT)

(72) Inventors: Francisco João Anastácio Duarte, Coimbra (PT); Adelino Jorge Lopes Ferreira, Coimbra (PT); Paulo Manuel Oliveira Fael, Covilhã (PT)

(73) Assignees: UNIVERSIDADE DE COIMBRA, Coimbra (PT); UNIVERSIDADE DA BEIRA INTERIOR, Covilhã (PT)

( * ) Notice: Subject to any disclaimer, the term of this patent is extended or adjusted under 35 U.S.C. 154(b) by 0 days.

(21) Appl. No.: 16/489,080

(22) PCT Filed: Feb. 27, 2018

(86) PCT No.: PCT/IB2018/051247
§ 371 (c)(1),
(2) Date: Aug. 27, 2019

(87) PCT Pub. No.: WO2018/154543
PCT Pub. Date: Aug. 30, 2018

(65) Prior Publication Data
US 2020/0007006 A1    Jan. 2, 2020

(30) Foreign Application Priority Data

Feb. 27, 2017  (PT) .......................... 109935
Feb. 27, 2017  (PT) .......................... 109936

(51) Int. Cl.
*F03G 7/00*    (2006.01)
*F03G 7/08*    (2006.01)
(Continued)

(52) U.S. Cl.
CPC ................. *F03G 7/08* (2013.01); *E01C 9/00* (2013.01); *H02K 7/1853* (2013.01)

(58) Field of Classification Search
CPC .. E01C 9/00; E01C 9/007; F03G 7/08; H02K 7/1853
See application file for complete search history.

(56) References Cited

U.S. PATENT DOCUMENTS 3,895,236 A * 7/1975 Herron ...................... F03G 7/00
                                                            290/55
4,004,422 A * 1/1977 Le Van ...................... F03G 7/08
                                                            60/533
(Continued)

FOREIGN PATENT DOCUMENTS

CN        105332869 A    2/2016
EP        2584196 A1     4/2013
(Continued)

*Primary Examiner* — Julio C. Gonzalez
(74) *Attorney, Agent, or Firm* — Leason Ellis LLP

(57) ABSTRACT

Device for applying in a pavement for collecting mechanical energy from a vehicle passing over said pavement for actuating an electromechanical converter for generating electrical energy, said device comprising: an electromechanical converter; a mechanical or mechanical-hydraulic system comprising a crank-linear slide or crank-piston; a base structure for supporting and fixing the device to the pavement; a cover displaceable in vertical axis translation caused by the vehicle passing over, wherein the cover is arranged to actuate the crank-linear slide or crank-piston; a rack-pinion, or a hydraulic cylinder and respective hydraulic circuit having actuator, arranged for converting linear displacement of the linear slide or the piston, respectively, into rotation of a shaft of the electromechanical converter; wherein said cover has a non-horizontal surface profile
(Continued)

having a first elevation at a first end and a second elevation at a second end, wherein the first elevation is lower than the second elevation.

15 Claims, 8 Drawing Sheets

(51) Int. Cl.
  *E01C 9/00* (2006.01)
  *H02K 7/18* (2006.01)

(56) References Cited

U.S. PATENT DOCUMENTS

| | | | | |
|---|---|---|---|---|
| 4,418,542 | A * | 12/1983 | Ferrell | F04B 9/00 417/229 |
| 6,767,161 | B1 * | 7/2004 | Calvo | F03G 7/08 290/1 R |
| 6,936,932 | B2 * | 8/2005 | Kenney | F03G 7/08 290/1 R |
| 8,928,160 | B2 * | 1/2015 | Jang | F03G 7/08 290/1 R |
| 2007/0085342 | A1 * | 4/2007 | Horianopoulos | F03G 7/08 290/1 R |

FOREIGN PATENT DOCUMENTS

| | | |
|---|---|---|
| KR | 101062620 B1 | 9/2011 |
| WO | WO 2010025616 A1 | 3/2010 |
| WO | WO 2013114253 A1 | 8/2013 |

\* cited by examiner

DEVICE FOR APPLYING IN A PAVEMENT FOR COLLECTING MECHANICAL ENERGY FROM VEHICLES PASSING OVER FOR GENERATING ELECTRICITY

CROSS-REFERENCE TO RELATED APPLICATIONS

This application is a U.S. National Stage Application under 35 U.S.C. § 371 of International Patent Application No. PCT/1132018/051247, filed Feb. 27, 2018 which claims priority to Portugal Patent Application No. 109936, filed Feb. 27, 2017 and Portugal Patent Application No. 109935, filed Feb. 27, 2017, the contents of which are each hereby incorporated by reference in their respective entireties.

TECHNICAL FIELD

The present disclosure relates to a device for applying in a pavement for collecting mechanical energy from a vehicle passing over said pavement, for actuating a mechanical or mechanical-hydraulic system for actuating a converter for generating electrical energy.

BACKGROUND

The electric energy generation is still highly dependent on thermal power plants supplied by fossil fuels and nuclear energy, having been verified in the past decades an increase on the implementation of electrical energy generation systems based on renewable sources, namely hydroelectric power plants and wind farms, Onshore and Offshore. The implementation of power plants using solar energy, mainly using photovoltaic panels, has been increasing in recent years, mainly due to the decrease in the cost of production of this type of technology.

The large scale generation methods described above are found, usually, distant from the large urban and industrial centres where electric consumption is greater. Thus, it is necessary to transport the electric energy to these places, which implies energy losses in the grid that must be compensated with a greater resource consumption to generate this extra energy. Besides, the referred energetic resources not always are available (solar, wind and hydro energy) or need to be acquired by non renewable means (fossil fuel and nuclear), being this consumption ecologically undesirable.

Recently, to reduce the electric energy transport from power plants to urban centres, it has been adopted the concept of "micro generation" trough the implementation of low power electric generating devices on the houses and public places. The main technologies used for this type of generation are photovoltaic and wind converters, that needs for suitable climacteric conditions which, besides intermittent and geographically dependent, are also unpredictable.

Besides wind and solar energy, there is another energy resource in urban centres suitable for electric micro generation: vehicles traffic. The circulation of vehicles is intrinsically linked to urban centres, representing a potential source for energy harvesting, since their movement on the pavement represents a transfer of energy, which is maximized in places of deceleration or braking, and currently this energy is not being properly used. As so, the idea is to use the pavement as a vehicle's mechanical energy collector, in order to take advantage of the energy released by the movement of vehicles for electric energy generation.

The concept of harvest the released energy to the pavement by vehicles is not a novelty, since there already have been published devices that execute the same function. The patent application CA2715129A1 (as well as the patent applications WO2009098673A1 and US20050127677, and patent U.S. Pat. No. 7,830,071B2) are related to devices that make use of piezoelectric transducers in surfaces, that produce electric energy while being deformed due to the passage of people and vehicles. However the piezoelectric transducers are characterized by a low generation capacity, whose applications needs a large number of devices to achieve a considerable electricity production, which place some doubts in the project feasibility once these piezoelectric units are highly costly. The present disclosure detaches form the latter described by introducing an alternative system, whose generation density is much higher than the systems referred above, which turns the electric energy production from the pavement much more sustainable.

Other technologies developed and patented comprise devices that work under the same principles of the present disclosure, once they have a single mechanical system that drives an electrical generator. However, these inventions are based on rack-pinion or lever mechanical systems. In the patent application US20090315334A1 (as well in the patent applications US20060152008A1 and US20110187125A1) is introduced a system with a work principle closer to the present disclosure. However, this conversion system, exclusive to road applications, comprises a tilted surface, which induces an excessive slowdown in the vehicles as they pass through it, increasing the possibility of getting damaged. The previous system (as the devices described in the patent applications WO2010088310A1, US20110049906A1 and CN201339553Y), has a surface that rotates on its longitudinal edge and conducts the load for the remaining mechanism in the opposite end. This method does not allow the use of the full load, since a part of it is distributed by the support where the extremity rotates reducing, consequently, the amount of captured energy. The present disclosure overcomes this issues once its surface is held flat, to do not affect the vehicles motion characteristics or its passengers' ride comfort, and to maximize the transmission of the forces exerted on it, since the latter are equally distributed and transferred from the surface to remain mechanical system, maximizing the collected mechanical energy.

According to the device described in the U.S. Pat. No. 7,714,456B1, the contact between the system and the vehicle tire occurs through one mechanical element instead of a flat surface which, due to its geometry configuration, turns the pavement into an irregular shape and exposes the pavement to external agents, shortening the system lifetime. These drawbacks are not found in the present disclosure, which comprises a surface in which the irregularities associated to its displacement are unnoticeable, with a conversion system isolated from external agents. In the previously referred technology, the electric generator is driven through flexible coupling elements (and not directly as in the present disclosure), turning the transmission system more vulnerable to failures. The system described in the U.S. Pat. No. 4,434,374 is only properly actuated when the load is applied in the centre of the surface, since is the contact point with the lever that converts the linear movement into rotational, achieving a less efficiency load transmission. In the present disclosure, as already referred, the load is equally transmitted for any point of actuation in the surface.

Other electromechanical systems converting the mechanical energy of vehicles into electric energy are disclosed in patents WO2011145057A2 and WO2013114253A1, these being constituted by a mechanical lever system for transmitting the force from the surface to the shaft of the electric generator. Systems similar to these are disclosed in patents US20070181372A1 and WO2009101448A1. The difference for these systems is the use of a crank-linear slide system, which allows to maximize the transmitted force from the surface to the slider, which later acts a rack-pinion mechanical system, acting the pinion with a torque much higher than previous systems. Thus, the acceleration of the electric generator will be greater, allowing to obtain higher speeds of rotation and, consequently, a greater amount of electrical energy generated.

Other systems developed for the same purpose have hydraulic or pneumatic mechanisms that serve as intermediates in the energy conversion process. Most systems rely on converting the mechanical energy captured by the surface of the device into potential energy by pressure, the latter being stored in an accumulator to subsequently drive a hydraulic actuator/turbine, connected to an electric generator, which produces electrical energy. Examples of such systems are disclosed in patents GB2461860A, US4173431, US4213431, US4211078, US4409489, US4739179, U.S. Pat. No. 5,634,774, US617242681, US6936932B2, US7541684B1, US20060147263A1, US20070246282A1, US20110215593A1, WO2007045087A1 and WO2010085967A1. In this type of systems the surface of the device directly actuates the fluid inside a tube or the piston of a cylinder that contains the fluid inside it, pressurizing the fluid and providing it with flow from the induced displacement. The main difference for the systems disclosed in the foregoing patents relative to the present disclosure is the introduction of a crank-linear slide system between the cover of the device and the hydraulic cylinder containing the fluid therein, allowing to increase the force transmitted to the piston of the cylinder, thereby increasing the pressure induced to the fluid and consequently the power delivered to the piston of this component.

In the road safety area, the most effective measures to control the speed of vehicles are vertical alignment changes of the pavement, as these usually affect the vehicle and its occupants, if speed limits are not respected. For this purpose, speed bumps are the main solution used to promote the reduction of the vehicles' speed, working by inducing discomfort to the occupants of the vehicle, thus forcing the deceleration of the vehicle before reaching such obstacles. Such device has some registered patents, such as patents CA1185474A, U.S. Pat. No. 6,174,103B1, U.S. Pat. No. 6,309,137B1 or U56623206. In relation to these patents, the solution proposed in the present disclosure is distinguished by the introduction of a cover with a vertical displacement and a specific profile, where the maximum height is equal to the maximum displacement, which minimizes the impact on the vehicle body and, at the same time, it extracts mechanical energy to it, reducing its speed.

These facts are disclosed in order to illustrate the technical problem addressed by the present disclosure.

General Description

The present disclosure relates to a device for applying in a pavement for collecting mechanical energy from a vehicle passing over said pavement, for actuating a mechanical-hydraulic or mechanical system through a crank-linear slide, for actuating an electromechanical converter, for generating electrical energy. A crank-linear slide system is used to transfer the force received by the cover of the device to a rack-pinion system, which converts the translational movement of the linear slide into a rotational movement of the shaft, said shaft being connected to an electromechanical converter, which converts the mechanical energy received by the cover of the device into electrical energy. The electromechanical converter may be part of the device or be connected to the external part of the device and may be driven by one or more mechanical systems, from one or more devices. The shaft of the electromechanical converter may be connected to a mechanical energy storage system. Alternatively, the linear slide may actuate a hydraulic cylinder piston, pressurizing a fluid inside said hydraulic cylinder, which is transmitted to a hydraulic actuator through a hydraulic circuit, which in turn actuates an electromechanical converter that produces electrical energy.

The device can also be operated without an electromechanical converter system, with the crank-linear slide system to be connected to a set of springs, being the device operated only as a mechanical energy receiver, in order to reduce the vehicles' speed thereof and promote the road safety.

One of the aims of the present disclosure is to create a device having an energy conversion system, intended to be applied on pavements, mainly road, in order to collect part of the mechanical energy released by vehicles when passing over the cover of the device and to convert the same into electrical energy. The device can also be operated without the energy conversion unit, operating only with the mechanical energy harvesting functionality, in order to reduce the vehicles' speed of movement.

The present disclosure is useful for allowing the generation of electric energy by means of a renewable and alternative energy source, which does not require any fossil fuel as an energy source, and therefore has the main advantage of not emitting greenhouse gases (mainly $CO_2$) during the production of electric energy, thus allowing the reduction of the environmental impact caused by electric generation technologies. The main application of this device is in road pavements, in order to be operated by land vehicles. The secondary application of this device consists in reducing the speed of movement of vehicles, by extracting mechanical energy from them, thus promoting road safety in places where it is necessary for vehicles to move at low speeds, such as approaching crosswalks.

As such, the present disclosure relates to a device for applying in a pavement for collecting mechanical energy from a vehicle passing over said pavement and converting it into electrical energy, comprising an electromechanical system or a hydraulic system to perform the energy transmission and conversion. In its main configuration, the device is composed of a movable surface (its cover) that is driven by the force exerted by the tires of moving vehicles, which is connected to a crank-linear slide system, with the linear slide moving on a linear guide fixed to the base structure of the device, being in turn connected to a rack-pinion system, said pinion being connected to a shaft which drives a electromechanical converter, which converts the received mechanical energy into electrical energy. The pinion is connected to the shaft through a one-way bearing so that said shaft is only driven in a rotational direction and consequently the electromechanical converter maintains the same direction of rotation. To the shaft of the converter, an inertia wheel can also be coupled so as to store a portion of the kinetic energy delivered to it, maintaining the rotation of the shaft for a longer time. The electromechanical converter can be applied inside or outside the device. In the case of an internal application, the drive shaft can be connected directly to the pinion shaft or connected through a mechanical connection, which can be made by sprockets or pulleys and a belt. In the case of an external application of the electromechanical converter, the connection with the pinion shaft will be made through a mechanical pulley connection and a belt.

In a secondary configuration, the linear slide is connected to the shaft of a hydraulic cylinder, which contains a fluid therein, which is connected to a hydraulic circuit. The hydraulic circuit consists of a reservoir which contains the fluid therein, connected by piping and a non-return valve to the hydraulic cylinder, which in turn is connected by piping and another non-return valve to a hydraulic actuator, with the possibility of an accumulator be connected to this, connected to the piping of the circuit through a valve. The hydraulic actuator is also hydraulically connected to the reservoir via piping. The hydraulic actuator can be rotating or linear and is connected to an electromechanical converter, rotary or linear, either directly or through a mechanical motion-converter system. In the case of a rotary actuator, the shaft of this element is connected directly to the shaft of a rotary electromechanical converter. In the case of a linear actuator, the shaft of this element may be connected directly to the shaft of a linear electromechanical converter, or connected to a mechanical motion converter system from linear to a unidirectional rotary motion, which is connected to the shaft of a rotary electromechanical converter.

The device also has a set of springs, responsible for performing a force opposing the movement of the cover, accumulating mechanical energy and resetting the cover to its initial position, after the wheel of the vehicle leaves the contact with it. The device also has a set of linear guides connected to the cover and the base, which are responsible for maintaining the translation movement of the cover only on the vertical axis and ensuring that regardless of the point of application of the load on the cover, it will move downwards balanced.

The crank-linear slide system may be embodied by one or more connecting cranks in parallel, connected to the same linear slide, so as to distribute the force transmitted from the cover to the linear slide.

Each device may contain one or multiple crank-linear slide systems, dividing the force received by the cover through the multiple crank-linear slide systems used. In the case of the use of multiple crank-linear slide systems, these can all be connected to a single rack-pinion system or a single hydraulic cylinder, or each crank-linear slide system can be connected to a one rack-pinion system or hydraulic cylinder.

The device can also be operated without the rack-pinion system or hydraulic system and without the electromechanical converter, with the crank-linear slide system being connected to a set of springs, which in turn are connected to a support connected to the base structure of the device. In this application, springs are not applied between the cover and the base structure. With this configuration, the device will collect mechanical energy and store a part of it in the springs, which is used only to reset the cover of the device to its initial position. The purpose of this application is to collect mechanical energy from the vehicles passing over the device, in order to reduce their speed and thus promoting road safety.

The application of the device on the pavement can be done in a unitary or multiple way, in the latter case the device can be applied sequentially, directly connected to each other or with spacing between each other. In the case of the application of multiple devices and the application of the electromechanical converter on the outside of the device, said converter can be driven by the mechanical system of a single device or by the mechanical systems of multiple devices, in which case there is an external mechanical connection to the devices that makes the connection between the mechanical systems of all the devices and the electromechanical converter. In the case of the application of multiple devices and using one or multiple hydraulic cylinders per device, only one hydraulic system is used, consisting of a reservoir and a hydraulic actuator, with or without connection to a hydraulic accumulator, with the fluid being controlled through valves, applied in the hydraulic circuit where the fluid is transmitted from the reservoir to the various hydraulic cylinders, as well as from the hydraulic cylinders to the hydraulic actuator or the hydraulic accumulator, and from the hydraulic actuator to the reservoir.

It is disclosed a device for applying in a pavement for collecting mechanical energy from a vehicle passing over said pavement for actuating an electromechanical converter for generating electrical energy, said device comprising:
- an electromechanical converter;
- a mechanical or mechanical-hydraulic system comprising a crank-linear slide or crank-piston;
- a base structure for supporting and fixing the device to the pavement;
- a cover displaceable in vertical axis translation caused by the vehicle passing over, wherein the cover is arranged to actuate the crank-linear slide or crank-piston;
- a rack-pinion, or a hydraulic cylinder and respective hydraulic circuit having an actuator, arranged for converting linear displacement of the linear slide or the piston, respectively, into rotation of a shaft of the electromechanical converter; wherein said cover has an inclined surface profile having a first elevation at a first end and a second elevation at a second end, wherein the first elevation is lower than the second elevation.

In an embodiment, the difference in elevation between the first end and second end is equal to the maximum vertical axis translation displacement of the cover caused by the vehicle passing over.

In an embodiment, the first elevation is a minimum height of said profile and the second elevation is a maximum height of said profile.

In an embodiment, the first end is for the vehicle initiating contact with the cover when passing over and the second end is for the vehicle ending contact with the cover when passing over.

In an embodiment, the first end and second end of the cover are located at opposite ends in relation to said cover.

In an embodiment, the surface profile is arranged relative to pavement elevation such that
- when the vehicle is not passing over, the profile at a first end of the cover has an elevation equal to the elevation of the pavement, and
- when the vehicle is passing over, the profile at a second end of the cover has an elevation equal to the elevation of the pavement.

In an embodiment, the surface profile is shaped as a fixed angle ramp, as a decreasing angle ramp, as an increasing angle ramp, or as a double angle ramp having an increasing angle from the first end of the cover and up to half of the surface profile and a descending angle from half of the surface profile to the second end of the surface profile.

In an embodiment, the surface profile is shaped as a planar ramp, or non-planar as a convex slope, as a concave slope, or as a slope having a first concave portion located from the first end of the cover and having a second convex portion located from the second end of the cover.

In an embodiment, the cover is displaceable only in vertical axis translation.

In an embodiment, the crank-liner slide is connected at the crank to the cover through a fixed connecting element, for converting the vertical axis translation movement of the cover into a horizontal translational movement of the linear slide.

In an embodiment, the crank-piston is connected at the crank to the cover through a fixed connecting element, for converting the vertical axis translation movement of the cover into a translational movement of the piston.

An embodiment comprises a set of springs and a set of linear guides both sets connected to said cover, such that the cover is displaceable only on a vertical axis and when the force exerted by a tire of the passing vehicle is greater than an opposing force exerted by the set of springs and by the mechanical or mechanical-hydraulic system applied beneath the cover.

An embodiment comprises a set of mechanical supports for the springs, connected to the base and the cover, for limiting the movement of the cover as stroke ends, when the cover reaches the maximum displacement.

An embodiment comprises a plurality of cranks-linear slides or a plurality of cranks-pistons, between the cover and the base structure, for being actuated by the cover.

In an embodiment, the plurality of slides of the plurality of the cranks-linear slides are mechanically connected to each other for being actuated by the cover in the same direction, and connected to a single rack-pinion for driving the shaft of the electromechanical converter.

In an embodiment, the plurality of slides of the plurality of the cranks-linear slides are mechanically connected to a single rack-pinion, pair-wise in opposite directions, for driving the shaft of the electromechanical converter.

An embodiment comprises a plurality of racks-pinions, or a plurality of hydraulic cylinders and respective hydraulic circuit having actuators, arranged for converting linear displacement of the linear slide(s) or the piston(s), respectively, into rotation of the shaft of the electromechanical converter.

In an embodiment,
the electromechanical converter is
a rotary electromechanical converter and the hydraulic circuit actuator is a rotary actuator which is connected directly to the rotary electromechanical converter; or
the electromechanical converter is a linear electromechanical converter and the hydraulic circuit actuator is a linear actuator which is connected directly to the linear electromechanical converter; or
the electromechanical converter is a linear electromechanical converter and the hydraulic circuit actuator is a linear actuator which is connected directly to the rotary electromechanical converter through a linear-to-rotary motion converter.

It is also disclosed a pavement for collecting mechanical energy from a vehicle passing over said pavement for actuating an electromechanical converter for generating electrical energy, said pavement comprising a plurality of devices each according to any of the disclosed embodiments.

In an embodiment, the devices are sequentially placed to form said pavement.

In an embodiment, the devices are sequentially placed for the vehicle passing over, with or without spacing between the devices.

An embodiment comprises a mechanical connection between the devices for actuating a common electromechanical converter.

An embodiment comprises a further device for applying in a pavement for collecting mechanical energy from a vehicle passing over said pavement, said further device comprising a mechanical or mechanical-hydraulic system comprising a crank-linear slide or crank-piston; a base structure for supporting and fixing the device to the pavement; a cover displaceable in vertical axis translation caused by the vehicle passing over, wherein the cover is arranged to actuate the crank-linear slide or crank-piston; wherein said cover has a an inclined surface profile having a first elevation at a first end and a second elevation at a second end, wherein the first elevation is lower than the second elevation.

BRIEF DESCRIPTION OF THE DRAWINGS

The following figures provide preferred embodiments for illustrating the disclosure and should not be seen as limiting the scope of invention.

DETAILED DESCRIPTION

Figure 1:
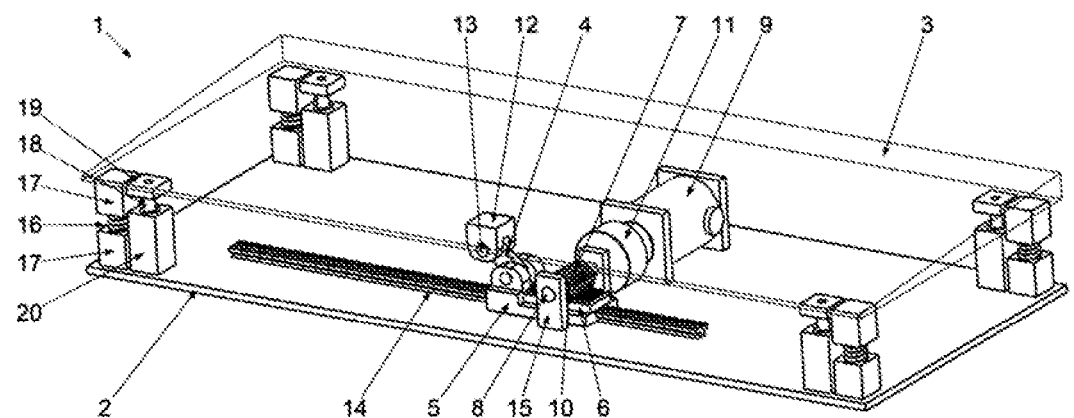
FIG. 1: Schematic representation of an embodiment of the device for collecting the mechanical energy from vehicles and actuate an electromechanical converter through a crank-piston or crank-linear slide system.

The present disclosure relates to a device 1 for applying in a pavement for collecting mechanical energy from a vehicle passing over said pavement, to actuating an electromechanical system for generating electrical energy. The device comprises a movable cover 3 which is driven by the force exerted by the tires or wheels of moving vehicles, which is connected to a crank-linear slide system 4-5, with the linear slide 5 moving on a linear guide 14 fixed to the base structure 2 of the device, being in turn connected to a rack-pinion system 6-7, said pinion 7 being connected to the shaft 8 of an electromechanical converter 9, which will convert the received mechanical energy into electrical energy.

The tire of a moving vehicle exerts a force on the cover 3, depending on the characteristics of the vehicle and its movement, but also depending on the characteristics of the cover itself, namely its surface profile, the angle of this element having a great influence on the dynamic component of the force delivered by the vehicle tire. Since the cover 3 moves with a downwards translational movement on the vertical axis, when pressed by the tire of a moving vehicle, it should have an elevation equal to the elevation of the pavement at the point where the contact is initiated with the tire, and a different elevation at the opposite end, which should be equal to the maximum displacement allowed by the device 1, so that when the tire leaves the contact with the cover, it is at the pavement level. To this end, different surface profiles may be assigned to the cover: fixed angle ramp 21, decreasing angle ramp 22, increasing angle ramp 23, or double angle ramp 24 having an increasing angle from the beginning and up half of the surface profile and a descending angle from the middle to the end of the surface profile.

The crank 4 of the crank-linear slide system 4-5 is connected to the cover 3 by a connecting part 12 embedded in the cover and a connecting shaft 13, which transmits the force received by the cover. The opposite end of the crank is connected to a linear slide 5, this element driving with a translational movement on the horizontal axis, transmitting a force different from that received in the cover, which depends on the length and initial angle of the crank. To maximize the delivered force without affecting the linear slide motion conditions, the initial angle of the crank should be greater than 60 degrees and lower than 75 degrees.

The crank-linear slide system 4-5 can be embodied by one or more cranks 4 in parallel, connected to the same connecting part 12 to the cover 3 and to the same linear slide 5, in order to distribute the force transmitted from the cover to the linear slide by more than one crank. With this, it will be possible to have a higher robustness in the device and, at the same time, to use lighter materials, in order to minimize the total inertia of the system.

In its preferable application, the linear slide 5 is connected to a rack-pinion system 6-7, which enables the translational movement of the linear slide 5 to be converted into a rotational movement of the pinion 7. The force received by the linear slide 5 is directly delivered to the pinion 7 through the rack 6, with the torque received by the pinion 7 being directly related to its radius—the greater the radius of this element, the greater the torque received, but the greater the opposition force to its motion it is performed.

The pinion 7 is connected to the shaft 8 by a unidirectional bearing 10, so that said shaft is driven only in a single rotational direction when the cover 3 is driven downwards and delivers force to the mechanical system. When the cover 3 has an upward movement, to recover its initial position, the pinion 7 rotates in the opposite direction, but does not realize torque on the shaft 8, this maintaining its direction of rotation. The shaft 8 is connected to the shaft of an electromechanical converter 9, directly by mechanical coupling, indirectly through the use of a pair of toothed wheels, one on each shaft, or indirectly through a pair of pulleys 29 and 31, one on each shaft, connected by a belt 30. To the shaft of the electromechanical converter 9 is also coupled an inertia wheel 11 so as to store a portion of the kinetic energy delivered to it, maximizing the rotation of the shaft after the delivery of torque thereto has been completed.

The device 1 has a set of springs 16, responsible for performing a force opposing the movement of the cover 3, accumulating a part of the mechanical energy collected by the cover and using this energy to replace the cover for its position after the tire of the vehicle leaves contact with it. Each spring 16 is applied inside a support 17 connected to the base structure 2 of the device and is compressed by another support 17 directly connected to the cover 3. The initial distance between the support attached to the base structure 2 and the support connected to the cover 3 is equal to the maximum allowable displacement of the cover 3 of the device, limiting the surface motion when the maximum displacement is reached.

The device 1 also has a set of linear guides 18 connected to the cover 3 and to the base structure 2, through an upper support 19 and a lower support 20, being responsible for maintaining the movement of the cover 3 only on the vertical axis and ensure that regardless of the point of application of the load, the cover 3 will move in a balanced manner. These elements are applied in parallel with the springs 16.

The electromechanical converter 9 can be applied inside the device 1 or outside. In the case of an internal application, the electromechanical converter 9 shaft can be connected directly to the pinion shaft 8 or connected through a mechanical connection, which can be made by toothed wheels or a set of pulleys and belt 29-31. In this scenario, one electromechanical converter 9 per device 1 is used. In the case of an external application of the electromechanical converter 9, the connection with the pinion shaft 8 is done through a mechanical pulley and belt connection 29-31. In this scenario, an electromechanical converter 9 can be connected to more than one devices 1 through a common mechanical connection 252.

Each device 1 may contain one or multiple crank-linear slide systems 4-5, dividing the force received by the cover 3 through the various crank-linear slide systems used, so as to improve the distribution of forces delivered by the cover 3 and the balance thereof. In the case of the use of multiple crank-linear slide systems 4-5, these can all be connected to a single rack-pinion system 6-7 and, consequently, drive a single shaft 8, or they can be connected to one rack-pinion system 6-7 for each crank-linear slide systems 4-5, depending on the configuration of the crank-linear slide systems 4-5. In the case where the crank-linear slide systems 4-5 are all driven in the same direction 40, they can be mechanically connected to each other by one or more rods 41 and to drive only a mechanical rack-pinion system. In the case where the crank-linear slide systems 4-5 are driven in opposite directions both from the centre of the device to the outside 42 or from the outside of the device to the centre 43, each crank-linear slide system 4-5 may be connected to an individual rack-pinion system 6-7 or be connected to one another through a vertical-axis rack-pinion intermediate system 34, so as to ensure that the movement of both linear slide is symmetrical and actuating a single rack-pinion system 6-7 connected to only one linear slide 5.

The device may also be operated without a rack-pinion system 6-7 and without an electromechanical converter 9, the crank-linear slide system 4-5 being connected to a set of springs 45 by means of a mechanical support 46 fixed to the linear slide 5, with the springs being fixed on a support 47 connected to the base structure 2 of the device. In this application 44, springs 16 between the cover 3 and the base structure 2 are not considered. With this configuration 44, the device collects mechanical energy and stores a portion thereof in the springs 45, which is used only to reset the cover 3 of the device to its initial position. By connecting the springs 45 to the crank-linear slide system 4-5, and the crank 4 (or set of cranks) having an initial angle between 60° and 75°, the force opposing to the cover motion made by the springs will be maximized. The purpose of the device with this configuration 44 is to oppose the movement of vehicles without the induction of a high vertical acceleration therein, contrary to what is realized by the road speed bumps. This action is achieved through the vertical displacement of the cover 3 and the opposing force exerted by the springs 45, connected to the cover through the crank-linear slide system 4-5. The interaction between the cover 3 and the tire of the vehicle will cause a deceleration of the vehicle and a consequent loss of speed of movement, this deceleration being directly proportional to the energy lost by the vehicle to the device. This configuration 44 may also be operated using multiple crank-linear slide systems 4-5, actuated by the cover 3 in the same direction 48 and with the linear slides connected by one or more connecting rods 41, or driven in opposite directions, from the inside to the outside 49 of the apparatus or from the outside to the inside 50 of the apparatus. In configuration 49, in which the crank-linear slide systems operate from the inside to the outside of the device, a vertical-axis rack-pinion system 34 is used to connect the two linear slides and thus ensure similarity of the linear slides' movement, both the slides connected to a set of individual springs 45. In configuration 50, in which the crank-linear slide systems operate from the outside to the inside of the device, the vertical-axis rack-pinion system 34 may not be used between the two linear slides, and both may be connected directly to a set of independent springs 46, supported on a common structure.

The application of the device 1 in the pavement can be done in a unitary way, with a single device, or in a multiple way, with the use of more than one device in one installation. In the case of multiple devices, these can be applied sequentially, either connected together or spaced from one another. In the case of the application of multiple devices and the application of the electromechanical converter 9 on the outside of the device, said converter can be actuated by the mechanical system of a single device 1 or by the mechanical systems of the multiple devices, with a mechanical connection used to connect the mechanical systems of all devices to the electromechanical converter 9. This configuration allows to reduce costs with electromechanical converter 9 units and to maximize the efficiency of the electromechanical converter 9, when driven by the energy collected by each device, maintaining its rotation for a longer time.

Other configuration of the device 1 is when the crank-linear slide system 4-5 is connected to a hydraulic cylinder 106, pressurizing a fluid therein. By actuating the piston of the hydraulic cylinder 106, a flow is induced in the fluid, which is moved through a hydraulic circuit 107 to a hydraulic actuator 108, which converts the flow rate of the fluid into a rotation movement of a shaft, which is connected to an electromechanical converter 109, which converts the collected and transmitted mechanical energy into electrical energy. When the cylinder 106 is actuated, the fluid is directed from a hydraulic reservoir 112 through a hydraulic circuit 107 directly to a hydraulic actuator 108, or it can be directed to a hydraulic accumulator 110 in an intermediate stage which is then directed to the hydraulic actuator 108, being controlled by a valve 111, connected to the circuit 107.

The hydraulic actuator may be rotary 108 or linear 130 and drive a rotating 109 or linear 152 electromechanical converter. For the case of a rotary hydraulic actuator 108, it receives the pressurized fluid at a certain flow rate, in relation to the mechanical characteristics of the hydraulic cylinder 106, the accumulator 110 and the force delivered to the fluid in the cylinder 106, converting the flow rate and pressure of the fluid into a rotational movement of a shaft, which is connected directly to the shaft of a rotating electromechanical converter 109, which converts the received mechanical energy into electrical energy, depending on the characteristics of the movement of the shaft, torque and electrical characteristics of the converter. In the case of a linear hydraulic actuator 130, it receives the pressurized fluid at a certain flow rate, depending on the mechanical characteristics of the hydraulic cylinder 106, the accumulator 110 and the force delivered to the fluid, converting the flow rate and pressure of a fluid into a linear movement of a piston within the actuator 130, which can be connected directly to the shaft of a linear electromechanical converter 152, which converts the received mechanical energy into electrical energy, or connected to a mechanical system 131 that converts linear to rotary motion which, in turn, is connected to the shaft of a rotary electromechanical converter 109. Irrespective of the type of hydraulic actuator, it directs the hydraulic fluid to the reservoir 112, the connection being made by the hydraulic circuit 107 comprised of tubing and accessories. If a linear actuator 130 is used, a directional valve 129 is used between the hydraulic circuit 107 and the actuator 130.

In the specific case of connecting a linear hydraulic actuator 130 to a rotating electromechanical converter 109, by means of a linear-to-rotary motion converter mechanical system 131, said mechanical system 131 is constituted by a base structure 132 connected to the shaft of the hydraulic actuator 130, to which are connected two independent racks, 133 and 134, connected in opposite zones and symmetrically in relation to the centre of the part 132. Each rack operates an independent pinion, 135 and 136, both pinions being connected to the same shaft 137 by one-way bearings which transmit torque to the shaft when driven in a rotational direction. When the mechanical system 31 is actuated in one direction, each rack drives its pinion in a different direction, but only one pinion transmits torque to the shaft, the other pinion being freely rotatable, due to the unidirectional bearing, not transmitting any movement to the respective shaft. When the mechanical system 131 works in the opposite direction, the pinion which in the previous direction has been freely rotated transmits torque, while the pinion which has transmitted torque is rotated freely, maintaining the direction of rotation of the shaft 137 which is connected to the rotating electromechanical converter 109 through a mechanical connection part 139.

Each hydraulic cylinder 106 only compresses the fluid and induces flow therein when the cover 3 is driven downwardly and delivers force to the crank-linear slide system 4-5. When the cover 3 is moved upwardly to recover its initial position, the linear slide 5 will pull the piston of the hydraulic cylinder 106, which will pull the fluid from the reservoir 112 into the cylinder 106. The control of the direction of the fluid in the hydraulic circuit is done by valves 113, which ensure that when the piston of the cylinder 106 is actuated so as to induce pressure into the fluid, the fluid is directed to the hydraulic accumulator 110 or to the hydraulic actuator 108, and when the piston of the cylinder 106 is actuated in the opposite direction, the fluid is transferred from the reservoir 112 into the cylinder 106.

The crank-linear slide system 4-5 can be embodied by one or more cranks 4 in parallel, connected by the same connecting part 12 to the cover 3 and the same linear slide 5, in order to distribute the force transmitted from the cover to the linear slide by more than one crank. Each device 1 may contain one or multiple crank-linear slide systems 4-5, dividing the force received by the cover 3 through the various crank-linear slide systems 4-5 used. In the case of the use of multiple crank-linear slide systems 4-5, these can be mechanically connected to one another and actuate a single hydraulic cylinder 106 or may actuate multiple hydraulic cylinders 106, one or more per linear slide 5.

In the case where the crank-linear slide systems 4-5 are all driven in the same direction 140, they can be mechanically connected to each other by one or more rods 41 and to drive one or more hydraulic cylinders 106 with each linear slide 5. In the case where the crank-linear slide systems 4-5 are driven in opposite directions both from the centre of the device to the outside 142 or from the outside of the device to the centre 144, each crank-linear slide system 4-5 may be connected to an individual hydraulic cylinder 106 or be connected to one another through a vertical-axis rack-pinion intermediate system 34, so as to ensure that the movement of both linear slides is symmetrical and actuating one or multiple hydraulic cylinders 106 connected to one linear slide 5 only.

The application of the device 1 in the pavement can be done in a unitary way, with a single device, or in a multiple way, with the use of several devices in one installation. In the latter case and with the application of one or more hydraulic cylinders 106 in each device 1, the hydraulic circuit 107 is shared by the multiple devices 1, there being only one reservoir 112, one hydraulic accumulator 110 and one hydraulic actuator 108 for multiple hydraulic cylinders 106. In this case, the control of the fluid is performed by unidirectional valves 113.

Application examples are disclosed herewith. From FIGS. 1 and 4 one can see the preferable implementation of the device 1, in which a crank-linear slide system 4-5 is used to connect the cover 3 of the device to a rack-pinion system 6-7, in order to maximize the force received by the cover from the tire of a moving vehicle, in which the pinion 7 is connected to a shaft 8 which actuates an electromechanical converter 9, which will convert the collected and transmitted mechanical energy into electrical energy. The purpose of this configuration is to harvest a portion of the mechanical energy released by vehicles to the pavement in deceleration zones, where the vehicle must necessarily lose energy, and convert the mechanical energy collected into electric energy. In this way, the device allows to generate electric energy from an energy that is currently not being used, without consuming resources of the planet, being considered as a source of alternative energy generation, contributing to the reduction of the emissions of gases with adverse effects the planet, associated with the production of electricity. By allowing the generation of electricity in places where it is consumed, it also allows the approximation of the place of generation to the place of consumption, eliminating the need for energy transportation, reducing energy losses associated with this process and promoting energy efficiency.

Figure 10:
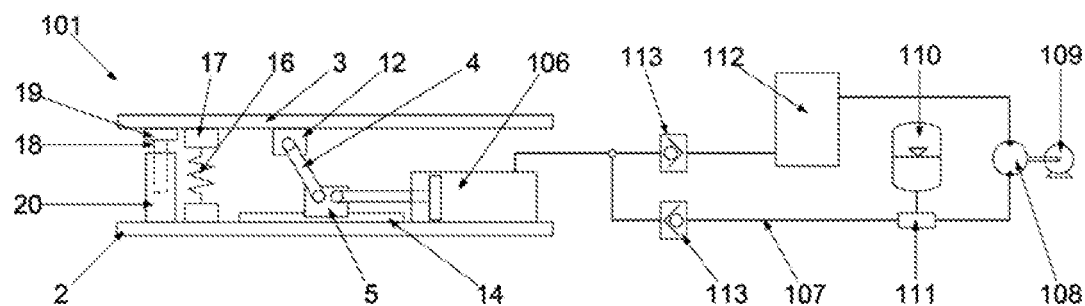
FIG. 10: Schematic representation of an embodiment of the device for collecting the mechanical energy from vehicles and actuate a hydraulic system from a crank-linear slide system which, in turn, actuates an electromechanical converter to produce electrical energy.
Figure 11:
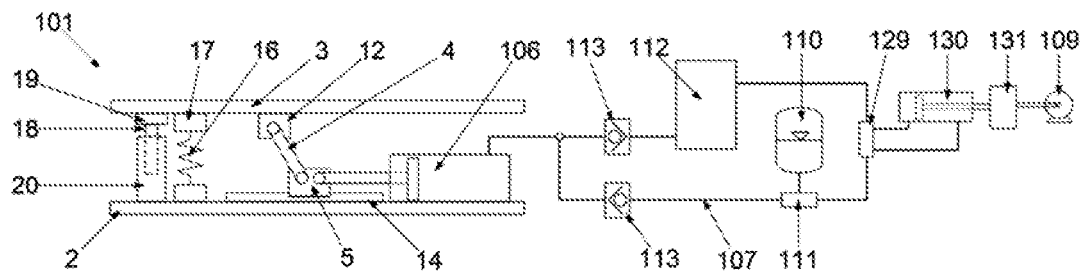
FIG. 11: Schematic representation of an embodiment of the device using a linear actuator and a mechanical system for actuating the rotational electromechanical converter.

From FIGS. 10 and 11, an alternative implementation of the device 1 can be observed, in which a crank-linear slide system 4-5 is used to connect the cover 3 of the device to a hydraulic cylinder 106, in order to maximize the force received by the cover 3 from the tire of a moving vehicle, with the hydraulic cylinder 106 being connected to a hydraulic actuator 108 by a hydraulic circuit 107, which may or may not be connected to a hydraulic accumulator 110 through a valve 111 that actuates an electromechanical converter 109, which will convert the collected mechanical energy into electrical energy.

Figure 7:
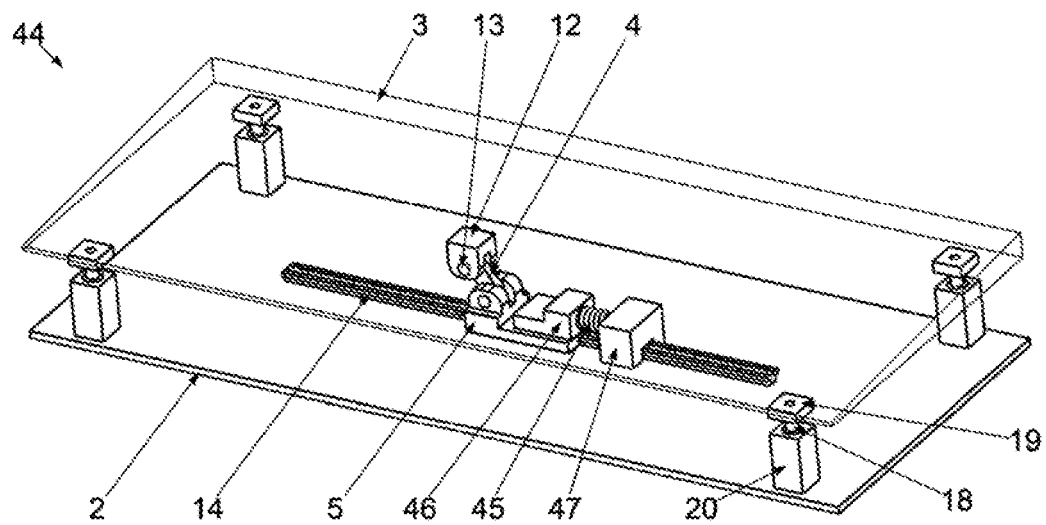
FIG. 7: Schematic representation of an embodiment of the device to collect mechanical energy and actuate a spring through a crank-linear slide system.
Figure 8:
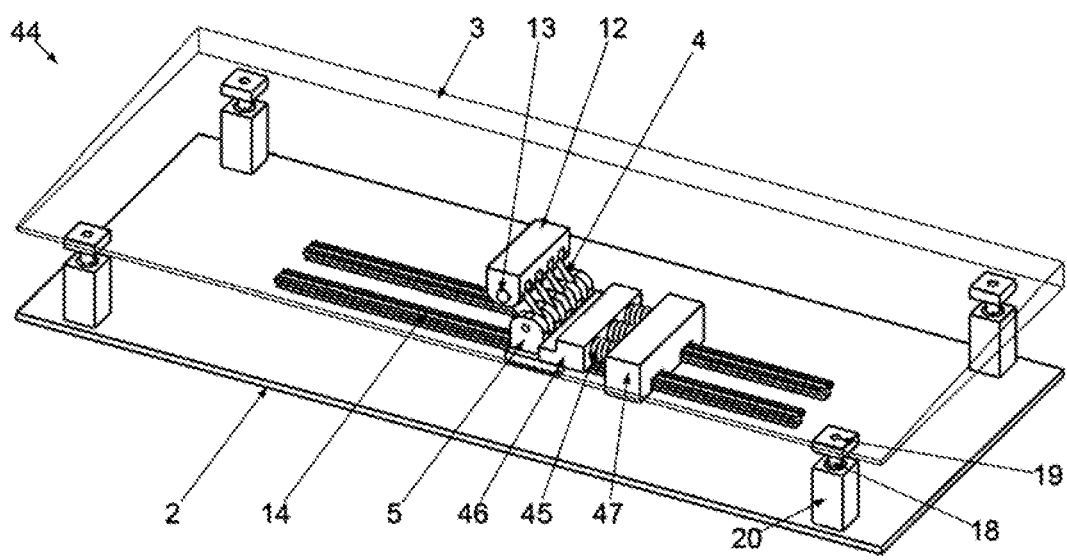
FIG. 8: Schematic representation of an embodiment of the device for collecting mechanical energy and actuating a set of springs through a multi-crank crank-linear slide system.

From FIGS. 7 and 8, an alternative application of the device 1 can be observed, with the sole purpose of collect mechanical energy from the vehicles passing over the device 44, part of which is accumulated in springs 45 actuated by the crank-linear slide system 4-5 and used only to reset the cover 3 of the device to its initial position after the tire of the vehicle leaves the contact therewith. In this configuration the rack-pinion system 6-7 and the electromechanical converter 9 are not used, and the springs 16 are not applied between the cover 3 and the base structure 2, being used springs 45 between a support 46 connected to the linear slide 5 and a support 47 connected to the base structure 2. In this configuration, it is through the surface profile of the cover and the opposing force exerted by the springs that an opposition is made to the movement of the vehicle, in the interaction between the vehicle tire and the cover of the device. The translational movement on the vertical axis of the cover allows the vehicle tire to enter and exit the contact with it at the pavement level, having a direct influence on the vertical acceleration induced on the vehicle, which is minimized. Compared with the typical speed bumps, the vertical acceleration induced in the vehicle is much lower, minimizing the discomfort caused to the occupants of the vehicle while, at the same time, more energy is collected from the vehicle, maximizing the vehicle speed loss and, consequently, road safety.

FIG. 1 shows a schematic representation of the device for collecting the mechanical energy from vehicles and actuate an electromechanical converter through a crank-piston or crank-linear slide system, in which 1 represents the device for collecting the mechanical energy from vehicles and actuation of an electromechanical converter through a crank-piston or crank-linear slide system, 2 represents the base structure for supporting and fixing the device to the pavement, 3 represents the cover of the device, 4 represents the connecting crank and 5 represents the linear slide, these being the main elements of the crank-linear slide system of the device. The component 6 represents the rack and 7 represents the pinion, these being the main elements of the rack-pinion mechanical system. The component 8 represents the shaft, connected to the pinion 7 through the component 10, which represents a unidirectional bearing. The component 9 represents the electromechanical converter, connected to the shaft 8 through the component 11, which represents an inertia wheel. The component 12 represents the connecting element between the cover 3 and the connecting crank 4, while the component 13 represents a connecting shaft between the crank 4 and the component 12. The component 14 represents a rail, whereby the linear slide 5 moves, and the component 15 represents the support of the shaft 8. The component 16 represents a spring, 17 representing the spring support connected between the spring 16 and the base structure 2 and between the spring and the cover 3. The component 18 represents a linear guide, fixed to the cover 3 through the connecting part represented by the element 19, sliding linearly by the component represented by 20, which is fixed to the base structure 2.

Figure 2:
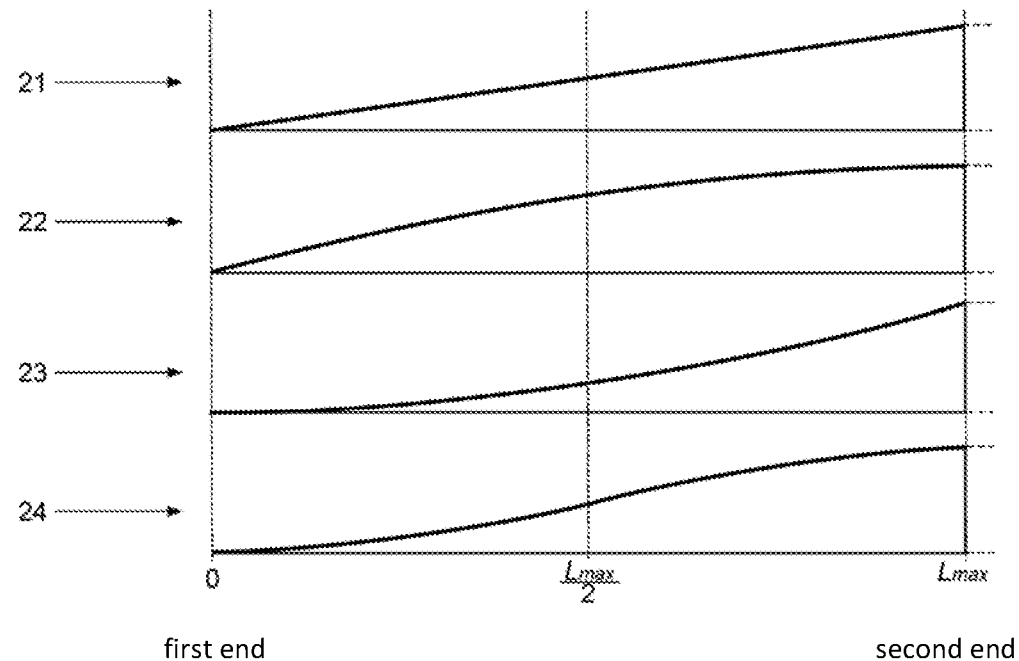
FIG. 2: Schematic representation of an embodiment of the cover surface profiles.

FIG. 2 shows a schematic representation of the cover surface profiles 3, in which 21 represents the surface profile with a fixed angle ramp, 22 represents the surface profile with a decreasing angle ramp, 23 represents the surface profile with an increasing angle ramp and 24 represents the surface profile with a ramp of double angle, having an increasing angle from the beginning and up half of the profile and a descending angle from the middle to the end of the surface profile.

Figure 3:
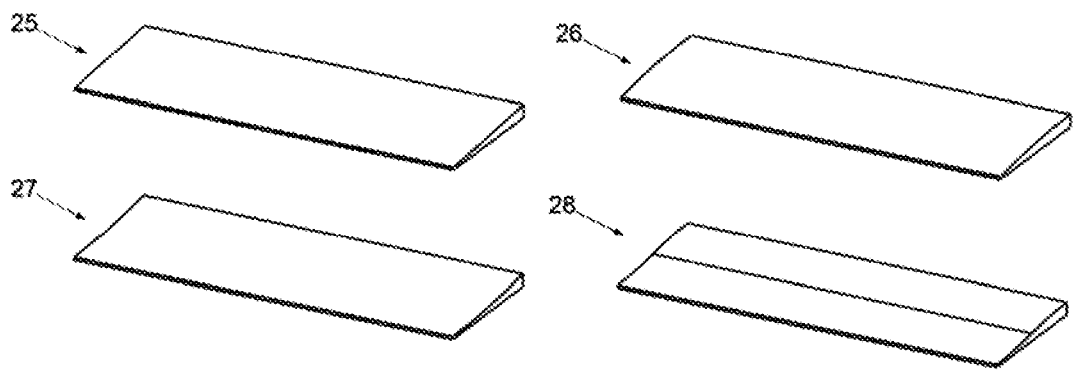
FIG. 3: Three-dimensional representation of an embodiment of the cover with the different surface profiles.

FIG. 3 shows a three-dimensional representation of the cover 3 with the different surface profiles, in which 25 represents the cover 3 with the fixed angle ramp surface profile 21, 26 represents the cover 3 with the decreasing angle ramp surface profile 22, 27 represents the cover 3 with the increasing angle ramp surface profile 23 and 28 represents the cover 3 with the double angle ramp surface profile 24.

Figure 4:
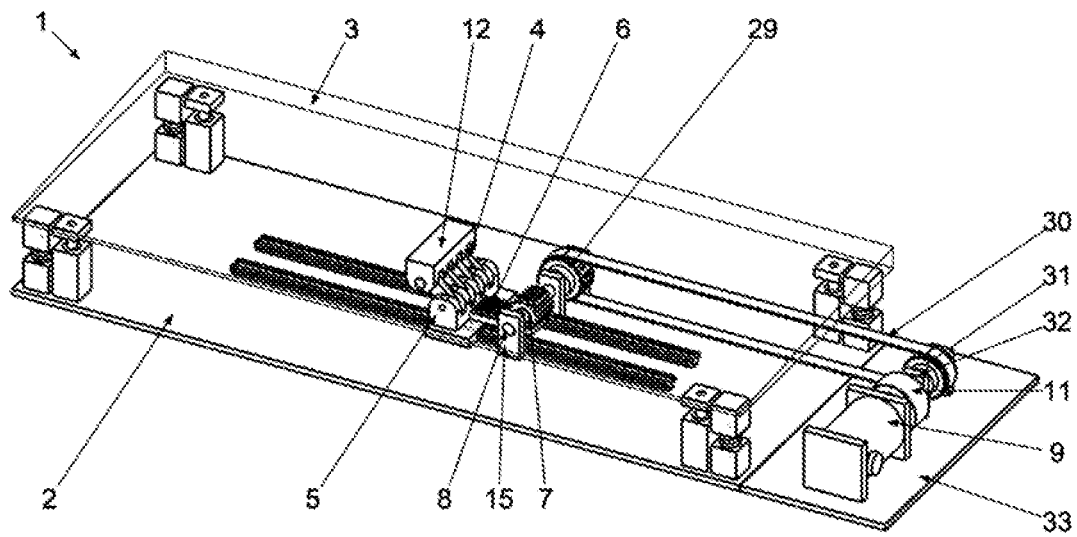
FIG. 4: Schematic representation of an embodiment of the device with a crank-piston or crank-linear slide system with multiple connecting cranks and the electromechanical converter applied at the outside of the device.

FIG. 4 shows a schematic representation of the device 1 with a crank-piston or crank-linear slide system 4-5 with multiple connecting cranks and the electromechanical converter 9 applied at the outside of the device, In which 29 represents a pulley connected to the pinion shaft 8, 31 represents a pulley connected to the shaft of the electromechanical converter, represented by 32, 30 represents a linking belt between the two pulleys 29 and 31, and 33 represents a support base for the electromechanical converter 9, which is connected to the shaft 32 by an inertia wheel 11.

Figure 5:
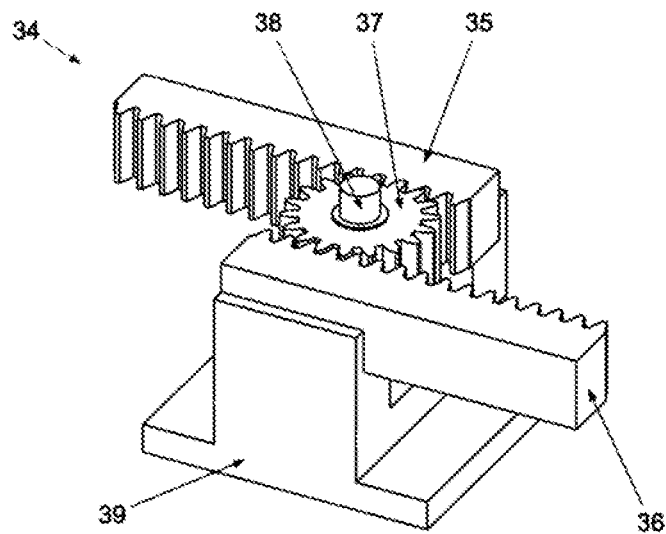
FIG. 5: Schematic representation of an embodiment of a vertical axis rack-pinion system for the mechanical connection of two linear slides.

FIG. 5 shows a schematic representation of a vertical axis rack-pinion system for the mechanical connection of two linear slides 5, in which 34 represents the vertical axis rack-pinion assembly for the mechanical connection between two linear slides, 35 represents a rack to be connected to a linear slide 5, 36 represents a second rack to be connected to another linear slide 5, both racks being connected to a pinion, represented by the component 37, 38 represents a shaft in which the pinion 37 is mounted in, and 39 represents the base structure where the entire system is supported.

Figure 6:
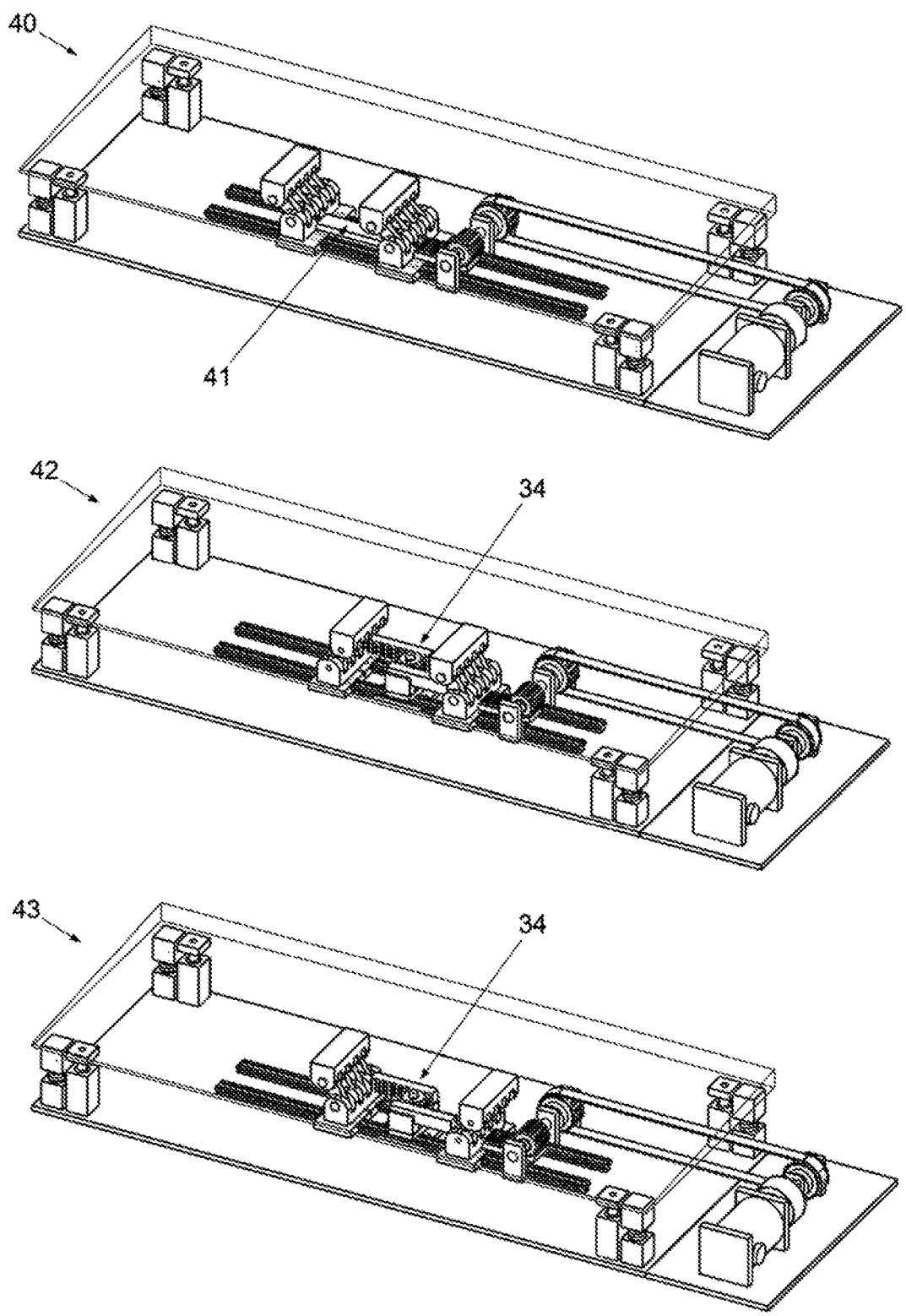
FIG. 6: Schematic representation of an embodiment of three possible configurations for the crank-piston or crank-linear slide system using multiple systems on the same device.

FIG. 6 shows a schematic representation of an embodiment of three possible configurations for the crank-piston or crank-linear slide system using multiple systems on the same device, in which 40 represents the device 1 with two crank-piston or crank-linear slide systems actuated by the cover 3 in the same direction, being connected by a connecting rod represented by the element 41, one of the linear slides 5 being connected to the rack-pinion system which drives a shaft, in turn connected to the shaft of the electromechanical converter through the pulley and belt connection. The assembly 42 represents the device 1 with two crank-piston or crank-linear slide systems driven by the cover 3 in opposite directions, from the centre to the outside of the device, the linear slides of both systems being connected by the vertical axis rack-pinion assembly 34. The assembly 43 represents the device 1 with two crank-piston or crank-linear slide systems driven by the cover 3 in opposite directions from the exterior of the device to the centre, the linear slides of both crank-linear slide systems being connected by the vertical axis rack-pinion assembly 34.

FIG. 7 shows a schematic representation of the device to collect mechanical energy and actuate a spring through a crank-linear slide system, in which 44 represents the device for collecting the mechanical energy of vehicles without energy conversion, 2 represents the base structure for supporting and fixing the device to the pavement, 3 represents the cover of the device, 4 represents the crank and 5 the linear slide, these being the main elements of the crank-linear slide system of the device. The element 45 represents a spring which is attached to the linear slide through a connecting component represented by 46 and 47 represents a spring support element which is connected to the base structure 2 of the device. The component 12 represents the connecting element between the cover 3 and the connecting crank 4, while the component 13 represents a connecting shaft between the crank 4 and the component 12. The component 14 represents a rail, whereby the linear slide 5 moves. The component 18 represents a linear guide fixed to the cover 3 through the connecting part represented by the element 19, sliding linearly by the component represented by 20, which is fixed to the base structure 2.

FIG. 8 shows a schematic representation of the device for collecting mechanical energy and actuating a set of springs through a multi-crank crank-linear slide system, In which 44 represents the device for collecting the mechanical energy of vehicles without energy conversion, 2 represents the base structure of the device, 3 represents the cover of the device, 4 represents the crank and 5 the linear slide, these being the main elements of the crank-linear slide system of the device. The component 45 represents a spring, with the various springs being connected to the linear slide 5 through a connecting element represented by 46. The element 47 represents the support of the springs, which is fixed to the base structure 2 of the device. The component 12 represents the connecting element between the cover 3 and the cranks 4, while the component 13 represents a connecting shaft between the cranks 4 and the component 12. The component 14 represents a rail, whereby the linear slide 5 moves. The component 18 represents a linear guide fixed to the cover through the connecting element represented by the element 19, sliding linearly by the component represented by 20, which is fixed to the base structure 2.

Figure 9:
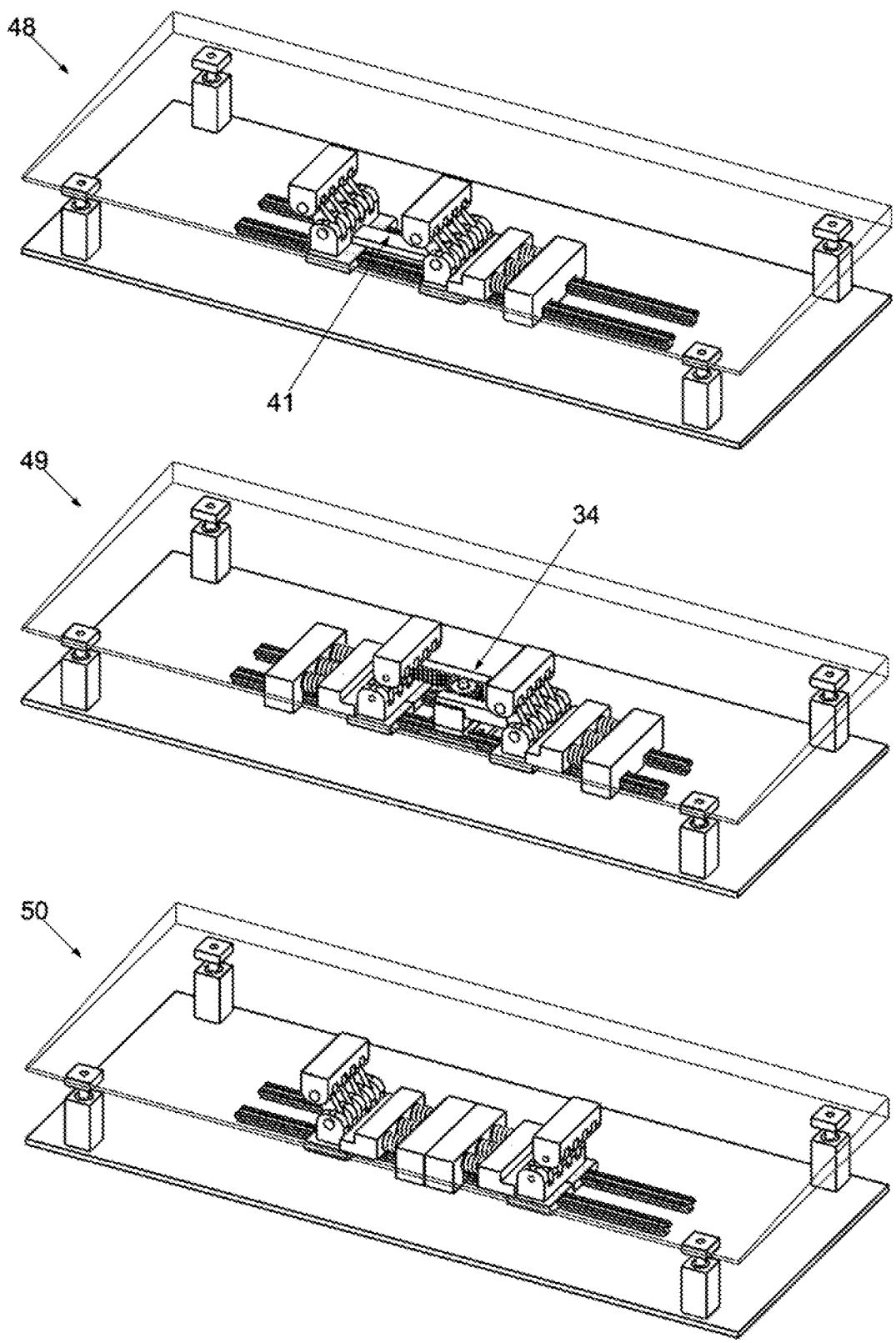
FIG. 9: Schematic representation of three possible configurations of an embodiment for the crank-linear slide system connected to a set of springs using multiple systems on the same device.

FIG. 9 shows a schematic representation of three possible configurations for the crank-linear slide system connected to a set of springs using multiple systems on the same device, in which 48 represents the device 44 with two crank-linear slide systems actuated by the cover 3 in the same direction and being connected by a connecting rod represented by the element 41, one of the linear slides 5 being connected to the set of springs. The assembly 49 represents the device 44 with two crank-linear slide systems actuated by the cover 3 in opposite directions, from the centre to the outside of the device, the slides of both systems being connected by the vertical axis rack-pinion assembly 34 and each slide driving a set of springs. The assembly 50 represents the device 44 with two crank-linear slide systems actuated by the cover 3 in opposite directions, from the exterior of the device to the centre, each linear slide being connected to a set of springs, which are supported by a common element, in the centre of the device.

FIG. 10 shows a schematic representation of the device for collecting the mechanical energy from vehicles and actuate an hydraulic system from a crank-linear slide system which, in turn, actuates an electromechanical converter to produce electrical energy, in which 1 represents the device for collecting the mechanical energy from vehicles and actuation of a hydraulic system from a crank-linear slide system that drives an electromechanical converter for electrical energy generation, 2 represents the base structure of the device, 3 represents the cover of the device, 4 represents the connecting crank and 5 the linear slide, these being the main elements of the crank-linear slide system of the device. The component 106 represents a hydraulic cylinder, the shaft of which is actuated by the linear slide 5 in order to compress a fluid within the cylinder. The component 107 represents the hydraulic circuit, which connects the various hydraulic elements and allows the fluid to circulate therein. The component 108 represents a rotary hydraulic actuator, which receives the pressurized fluid and a given flow rate, converting it into a rotational movement of a shaft, which is connected to a rotating electromechanical converter 109, which converts the received mechanical energy by the rotation movement of the shaft into electric energy. The component 110 represents a hydraulic accumulator connected to the hydraulic circuit 107 via a control valve 111 between the cylinder 106 and the actuator 108, which allows accumulating the pressure imposed to the fluid in the actuator to deliver it to the actuator 108. The component 112 represents the hydraulic reservoir, which contains the hydraulic circuit fluid, being connected to the cylinder 106 by the hydraulic circuit 107 and a unidirectional valve 113, so that the fluid flows only in the direction from the reservoir 112 to the cylinder 106, being also connected to the hydraulic actuator 108, receiving the fluid coming out of this component when actuated. A second unidirectional valve is used between the cylinder 106 and the actuator 108 or the reservoir 110 so that the fluid, when pressurized within the cylinder 106 only circulates in the direction from the cylinder 106 to the actuator 108 (or to the accumulator). The component 14 represents a rail, whereby the linear slide 5 moves and the component 15 represents the connecting element between the cover 3 and the connecting crank 4, which is embedded in the cover 3. The component 16 represents a spring, 17 representing the spring support connected between the spring 16 and the base structure 2 and between the spring and the cover 3. The component 18 represents a linear guide fixed to the cover 3 through the connecting part represented by the element 19, sliding linearly through the component represented by 20, which is fixed to the base structure 2.

FIG. 11 shows a schematic representation of the device 1 using a linear actuator 130 and a mechanical system 131 for actuating the rotational electromechanical converter 109, in which components 1-20 are the same as those shown in FIG. 10, the rotary hydraulic actuator 108 being replaced by a linear hydraulic actuator 130, connected to the hydraulic circuit 107 by a directional valve 129, which receives the fluid pressurized by an inlet and directs it into a chamber of the hydraulic actuator 130, acting the piston of this element, and receives fluid from the actuator through another inlet, directing it to the reservoir 112. The linear actuator 130 is connected to a mechanical system 131 which is responsible for converting the linear movement of the piston of the actuator 130 into a rotational movement of a shaft, which is connected to the rotary electromechanical converter 109, which converts the mechanical energy of said shaft into electrical energy.

Figure 12:
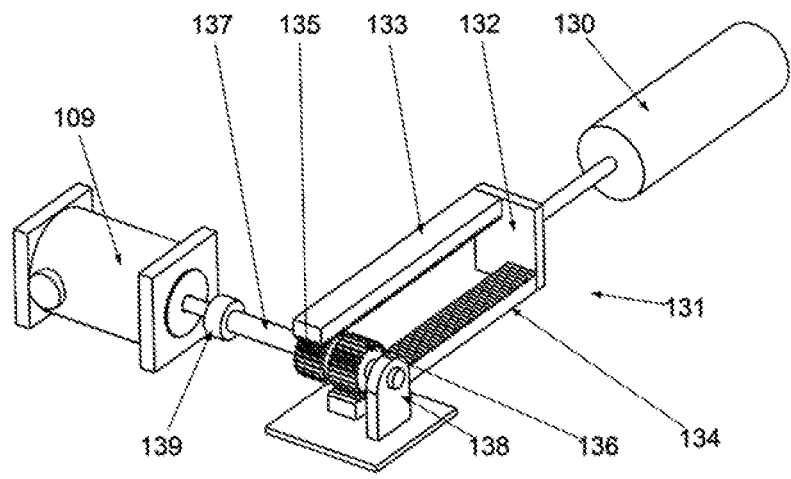
FIG. 12: Schematic representation of an embodiment of a mechanical system for converting the linear movement of the actuator into a rotational movement of a shaft.

FIG. 12 shows a schematic representation of a mechanical system 131 for converting the linear movement of the actuator 130 into a rotational movement of a shaft, in which 131 represents the mechanical system for converting linear to rotational motion, which is connected to a linear hydraulic actuator 130 through a base element 132, to which are attached two racks, represented by the elements 133 and 134, connected on opposite sides and symmetrically to the part 132. Each rack is mechanically connected to a pinion, the rack 133 being connected to pinion 135 and the rack 134 connected to pinion 136. Both pinions are connected to a shaft 137 through a unidirectional bearing applied to the pinion bore and which connects the pinion to the shaft 137. The shaft 137 is supported on a mechanical structure, represented by the element 138, and is connected to the rotating electromechanical converter 109 through a mechanical connecting part 139.

Figure 13:
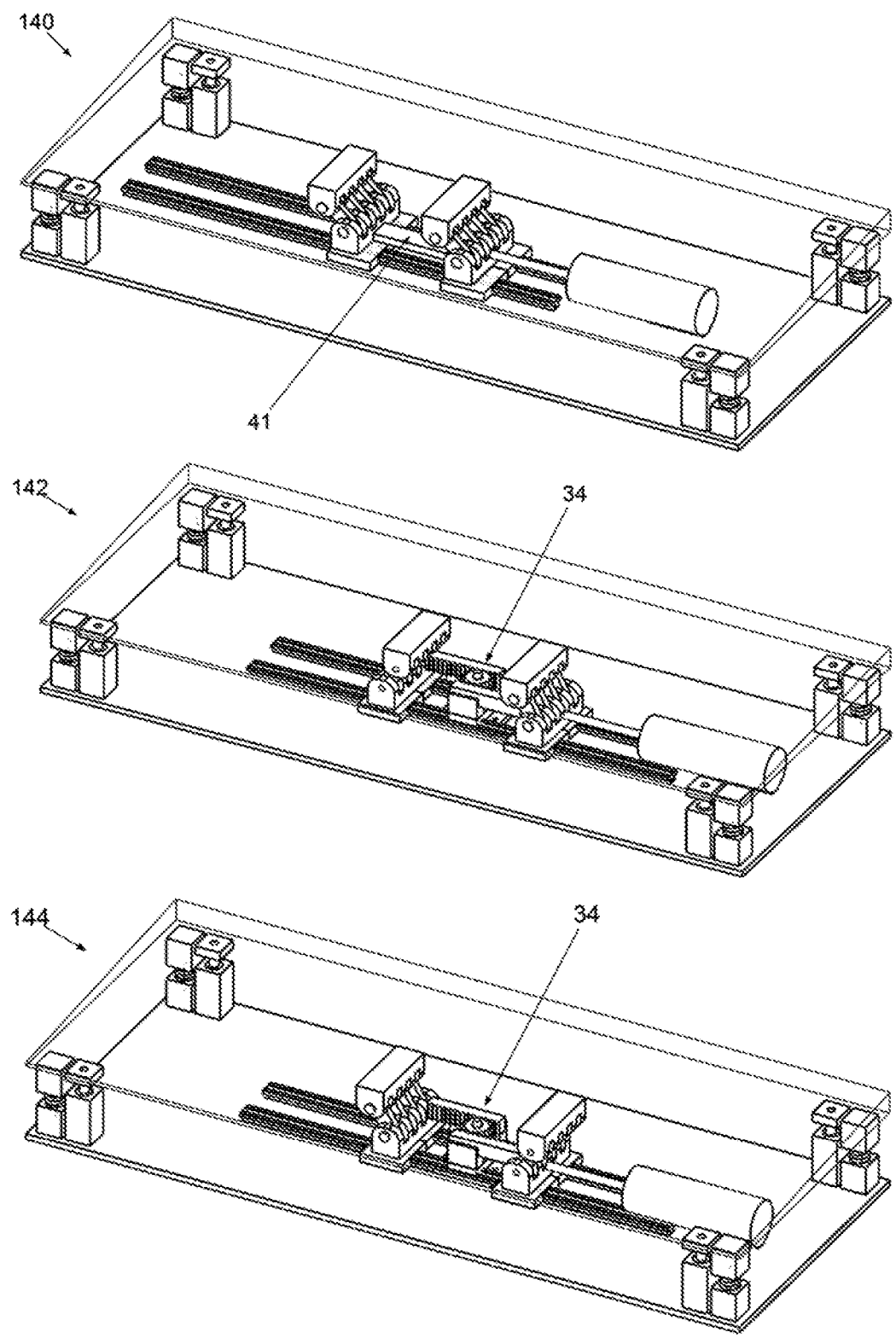
FIG. 13: Schematic representation of an embodiment of the device with three possible configurations when actuating a hydraulic system.

FIG. 13 shows a schematic representation of the device 1 with three possible configurations when actuating an hydraulic system, in which the assembly 140 represents the device for collecting the mechanical energy from vehicles and actuating a hydraulic system using two crank-linear slide systems in the same direction, the linear slides of which are connected by a connecting bar, represented by the element 41, one of the linear slides being directly connected to the shaft of the hydraulic cylinder.

The assembly 142 represents the device for collecting the mechanical energy of vehicles and actuation of a hydraulic system using two crank-linear slide systems, actuated in opposite directions, from the centre to the outside of the device, with the linear slides being connected by a vertical-axis rack-pinion mechanical system 34, and one of the linear slides being directly connected to the shaft of the hydraulic cylinder.

The assembly 144 represents the device for collecting the mechanical energy of vehicles and actuation of a hydraulic system using two crank-linear slide systems, actuated in opposite directions, from the outside to the centre of the device, with the linear slides being connected by a vertical-axis rack-pinion mechanical system 34, and one of the linear slides being directly connected to the shaft of the hydraulic cylinder.

Figure 14:
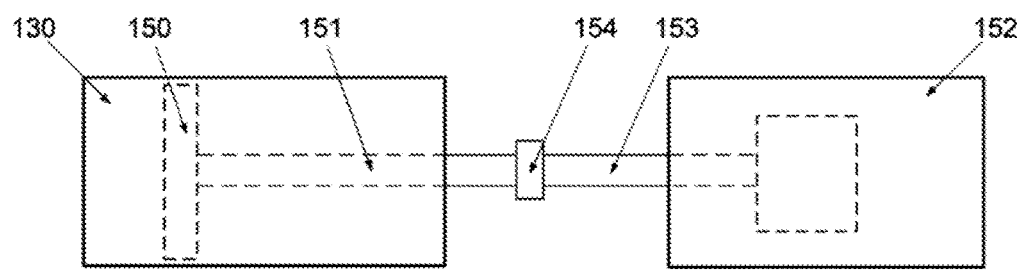
FIG. 14: Schematic representation of an embodiment of the linear hydraulic actuator connected to a linear electromechanical converter.

FIG. 14 shows a schematic representation of the linear hydraulic actuator 130 connected to a linear electromechanical converter 152, in which 130 represents a linear hydraulic actuator, 150 represents the piston of said actuator and 151 represents the shaft connected to the piston 150, this element being connected to a linear electromechanical converter, represented by the element 152, by means of a mechanical connection, represented by the element 154, which actuates the electromechanical converter shaft, represented by the element 153. As the piston 150 of the hydraulic actuator moves, it induces a displacement in the shaft 53 of the linear electromechanical converter 152, which converts the received mechanical energy into electrical energy.

Figure 15:
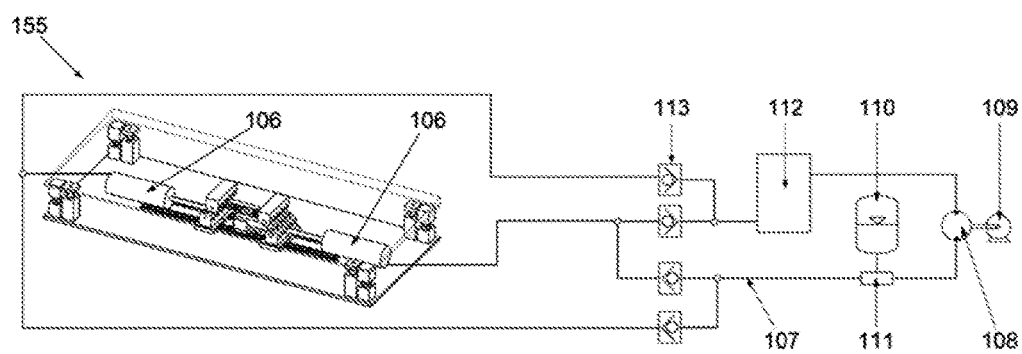
FIG. 15: Schematic representation of an embodiment of a device configuration with two crank-linear slide systems actuated in opposite directions from the centre to the outside of the device and connected to two hydraulic cylinders.

FIG. 15 shows a schematic representation of a device 155 configuration with two crank-linear slide systems actuated in opposite directions from the centre to the outside of the device and connected to two hydraulic cylinders 106, in which 155 represents the device for collecting the mechanical energy of vehicles and the actuation of a hydraulic system using two crank-linear slide systems actuated in opposite directions, from the centre to the outside of the device, the linear slides of which are connected by a vertical-axis rack-pinion mechanical system, each of the linear slides being directly connected to the shaft of an independent hydraulic cylinder 106. The connection between each cylinder 106 and the reservoir 112 is made by the hydraulic circuit 107 and unidirectional valves 113, so that the fluid flows only in the direction from the reservoir to the cylinder 106. Likewise, the connection between each cylinder 106 and the accumulator 110 is made by the hydraulic circuit 107 and unidirectional valves 113, so that the fluid flows only in the direction from the cylinder to the accumulator.

Figure 16:
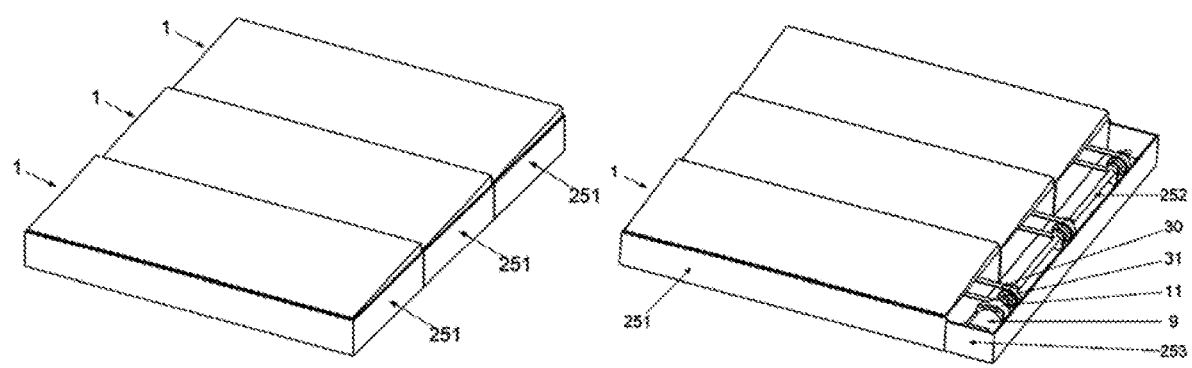
FIG. 16: Schematic representation of an embodiment of three devices connected sequentially in the pavement, with i) an electromechanical converter inside and ii) with a common electromechanical converter external to the device.

FIG. 16 shows a schematic representation of three devices 1 connected sequentially in the pavement, with i) an electromechanical converter 9 inside and ii) with a common electromechanical converter 9 external to the device, in which 251 is a support structure for the device 1, for protection of the mechanical elements of the device and for the installation on the pavement, 252 represents a mechanical linkage between the belts of the various devices 1 and the inertia wheel 11 connected to the electromechanical converter 9, there being a pulley 31 attached to the shaft 252 for each belt 30. The element 253 represents a structure external to the device 1, for supporting the electromechanical converter 9 and other elements.

The term "comprising" whenever used in this document is intended to indicate the presence of stated features, integers, steps, components, but not to preclude the presence or addition of one or more other features, integers, steps, components or groups thereof.

The disclosure should not be seen in any way restricted to the embodiments described and a person with ordinary skill in the art will foresee many possibilities to modifications thereof. The above described embodiments are combinable. The following claims further set out particular embodiments of the disclosure.

The invention claimed is:

1. A device for collecting mechanical energy from a vehicle passing over pavement through actuation of an electromechanical converter which generates electrical energy, said device comprising:
    an electromechanical converter;
    a mechanical or mechanical-hydraulic system comprising a crank-linear slide or crank-piston, respectively;
    a base structure for supporting and fixing the device to the pavement;
    a set of linear guides;
    a cover comprising a moveable surface connected to the set of linear guides so as to be displaceable only along a vertical axis, the displacement being caused by the vehicle passing over the cover, wherein the cover is arranged to actuate the crank-linear slide or crank-piston;
    a hydraulic cylinder and respective hydraulic circuit having an actuator, arranged for converting linear displacement of the linear slide or the piston, respectively, into rotation of a shaft of the electromechanical converter;
    wherein said cover has an inclined surface profile having a first elevation at a first end and a second elevation at a second end, wherein the first elevation is lower than the second elevation,
    wherein the first end and second end of the cover are located at opposite ends in relation to said cover, and the first end is for the vehicle initiating contact with the cover when passing over and the second end is for the vehicle ending contact with the cover when passing over, and
    wherein the surface profile is shaped as a decreasing-angle ramp, as an increasing-angle ramp, or as a double angle ramp having an increasing angle from the first end of the cover and up to half of the surface profile and a descending angle from half of the surface profile to the second end of the surface profile.

2. The device according to claim 1, wherein the difference in elevation between the first end and second end is equal to the maximum vertical axis displacement of the cover caused by the vehicle passing over.

3. The device according to claim 1, wherein the first elevation is a minimum height of said profile and the second elevation is a maximum height of said profile.

4. The device according to claim 1, wherein the surface profile is arranged relative to pavement elevation such that:
    when the vehicle is not passing over, the profile at a first end of the cover has an elevation equal to the elevation of the pavement, and
    when the vehicle is passing over, the profile at a second end of the cover has an elevation equal to the elevation of the pavement.

5. The device according to claim 1, wherein the surface profile has an angled ramp.

6. The device according to claim 1, wherein the crank-liner slide is connected at a crank to the cover through a fixed connecting element which converts the vertical axis displacement of the cover into a horizontal movement of a linear slide.

7. The device according to claim 1, wherein the crank-piston is connected at a crank to the cover through a fixed connecting element which converts the vertical axis displacement of the cover into a movement of the piston.

8. The device according to claim 1, further comprising a set of springs associated with the set of linear guides, both sets being connected to said cover, such that the cover is displaceable only along the vertical axis and when the force exerted by a tire of the passing vehicle is greater than an opposing force exerted by the set of springs and by the crank-linear slide or the crank-piston of the mechanical or mechanical-hydraulic system applied beneath the cover.

9. The device according to claim 8, further comprising a set of mechanical supports for the springs, connected to the base and the cover, wherein said mechanical supports are configured to limit the movement of the cover as stroke ends when the cover reaches the maximum displacement.

10. The device according to claim 1, further comprising a plurality of crank-linear slides or a plurality of crank-pistons, between the cover and the base structure, configured to be actuated by the cover.

11. The device according to the claim 10, wherein the plurality of slides of the plurality of the crank-linear slides are mechanically connected to each other, are actuated by the cover in the same direction, and are connected to a single rack-pinion in order to drive the shaft of the electromechanical converter.

12. The device according to claim 11, wherein the plurality of slides of the plurality of the crank-linear slides are mechanically connected to a single rack-pinion.

13. The device according to claim 1, wherein:
    the electromechanical converter is a rotary electromechanical converter and the hydraulic circuit actuator is a rotary actuator which is connected directly to the rotary electromechanical converter; or
    the electromechanical converter is a linear electromechanical converter and the hydraulic circuit actuator is a linear actuator which is connected directly to the linear electromechanical converter; or
    the electromechanical converter is a linear electromechanical converter and the hydraulic circuit actuator is a linear actuator which is connected directly to the rotary electromechanical converter through a linear-to-rotary motion converter.

14. A method for collecting mechanical energy from a vehicle passing over pavement, comprising the step of applying at least one device as in claim 1 within the pavement.

15. The method of claim 14, wherein the applying step applies at least two devices and the devices are sequentially placed to form at least a portion of said pavement.

* * * * *